(12) United States Patent
Perry (10) Patent No.: US 11,025,480 B2
(45) Date of Patent: Jun. 1, 2021

(54) AUTOMATED TROUBLESHOOTING OF A WIRELESS NETWORK USING A WIRELESS NETWORK CONTROL SYSTEM

(71) Applicant: ProdataKey, Inc., South Jordan, UT (US)

(72) Inventor: Joshua Perry, Sandy, UT (US)

(73) Assignee: PRODATAKEY, INC., South Jordan, UT (US)

( * ) Notice: Subject to any disclaimer, the term of this patent is extended or adjusted under 35 U.S.C. 154(b) by 0 days.

(21) Appl. No.: 15/783,625

(22) Filed: Oct. 13, 2017

(65) Prior Publication Data

US 2018/0109414 A1 Apr. 19, 2018

Related U.S. Application Data

(60) Provisional application No. 62/407,651, filed on Oct. 13, 2016.

(51) Int. Cl.
| | |
|---|---|
| *H04L 12/24* | (2006.01) |
| *H04L 12/26* | (2006.01) |
| *H04W 24/08* | (2009.01) |
| *G06F 11/07* | (2006.01) |
| *H04W 24/04* | (2009.01) |

(52) U.S. Cl.
CPC ...... *H04L 41/0631* (2013.01); *H04L 41/0654* (2013.01); *H04L 41/0836* (2013.01); *H04L 41/0896* (2013.01); *H04L 41/5025* (2013.01); *H04L 43/16* (2013.01); *H04W 24/08* (2013.01); *G06F 11/0709* (2013.01); *H04L 41/069* (2013.01); *H04L 43/062* (2013.01); *H04L 43/0876* (2013.01); *H04W 24/04* (2013.01)

(58) Field of Classification Search
None
See application file for complete search history.

(56) References Cited

U.S. PATENT DOCUMENTS

| | | | | |
|---|---|---|---|---|
| 8,811,172 B1* | 8/2014 | Sella | ...................... | H04L 45/56 370/230 |
| 2007/0189154 A1* | 8/2007 | Hourtane | ................ | H04L 12/42 370/218 |
| 2011/0149721 A1* | 6/2011 | Yang | ................... | H04L 41/0654 370/216 |
| 2017/0126477 A1* | 5/2017 | Ponnuswamy | ..... | H04L 41/0654 |

* cited by examiner

*Primary Examiner* — Jeffrey R Swearingen
(74) *Attorney, Agent, or Firm* — Morriss O'Bryant Compagni Cannon, PLLC (57) ABSTRACT

A system and method for identifying weaknesses in a wireless network, wherein a wireless network control system exercises a wireless network by transmitting a large volume of data between nodes in order to identify network weaknesses and communication bottlenecks, wherein the wireless network control system is automated so that it may perform identification of network problems without user intervention, and wherein the wireless network control system may make suggestions as to how the network weaknesses and communication bottlenecks may be repaired.

13 Claims, 7 Drawing Sheets

AUTOMATED TROUBLESHOOTING OF A WIRELESS NETWORK USING A WIRELESS NETWORK CONTROL SYSTEM

BACKGROUND

Field of the Invention

This invention relates generally to physical access control systems. Specifically, the invention pertains to a system and method for the troubleshooting of any wireless network, whether or not it is used for a physical access control system. The troubleshooting system and method may be especially useful because it may be automated through the use of a wireless network control program and may be used in a static and dynamic mode of operation.

Description of Related Art

Prior art door access control systems may be implemented using a wireless network that enables communication between various network nodes. The plurality of network nodes may communicate with one or more other network nodes using wireless transmission technology. However, various problems may arise because of the nature of wireless networks. For example, the problems may include, but should not be considered as limited to, bottlenecks where network clusters of nodes may only be able to communicate with each other through a single network node, flapping where network nodes may be trying to use the best path, but the best path may be constantly changing, and intermittent outages that may be difficult to identify.

Figure 1:
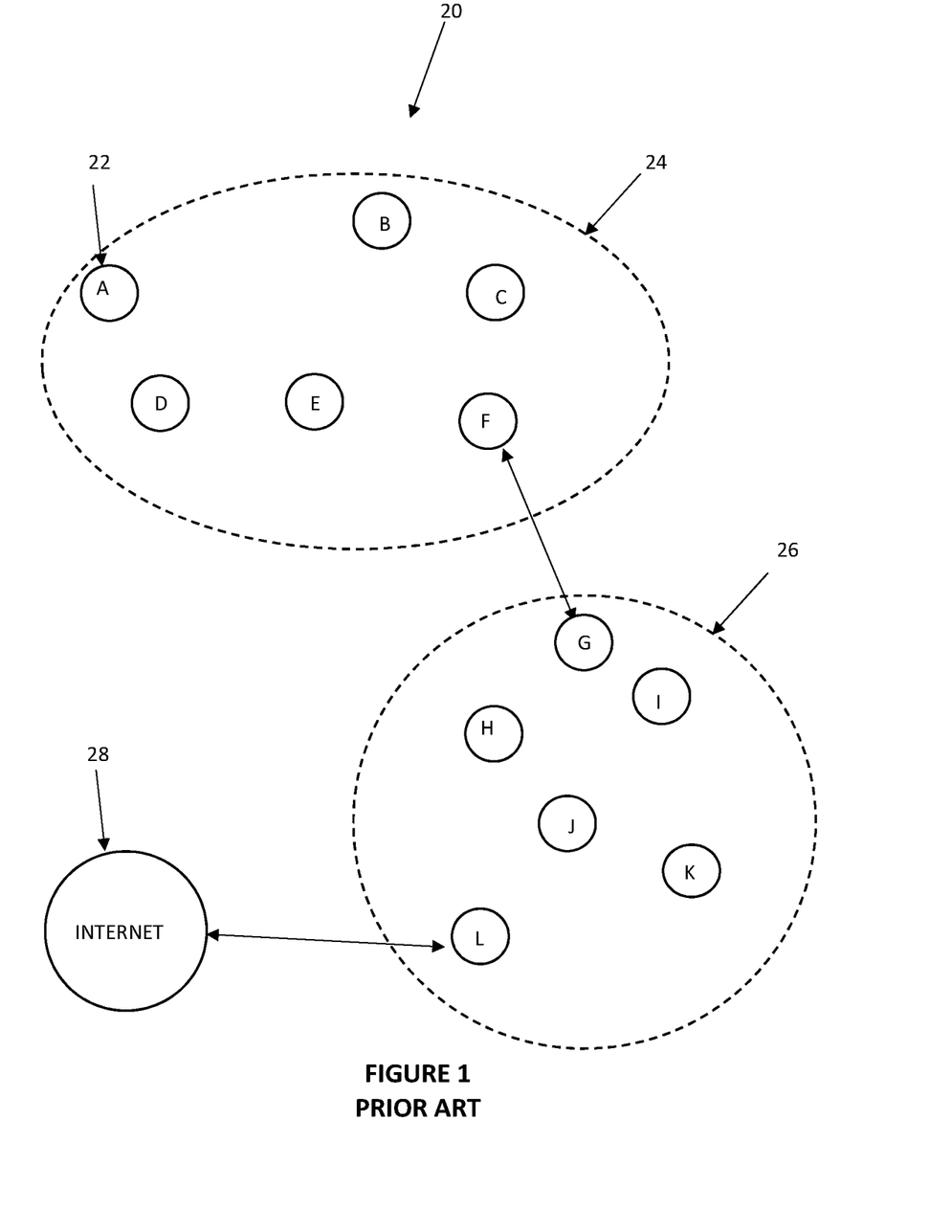
FIG. 1 is an illustration of a prior art wireless network illustrating a topology that may suffer from a bottleneck in data flow between network clusters.

For example, a first problem that may arise with wireless networks is shown in FIG. 1. FIG. 1 is a topology diagram of a wireless network that shows relative positions but not distances between twelve different network nodes 22 labeled A, B, C, D, E, F, G, H, I, J, K and L in a wireless network 20. The number of network nodes 22 is not important as there may be more or less network nodes.

A first structure that will be identified in the wireless network 20 is a network cluster. A network cluster may be defined as any group of network nodes that are able to communicate with each other but which may also be isolated from other network nodes because the network cluster may have limited paths for communicating outside the network cluster. In this example shown in FIG. 1, there are two network clusters 24 and 26 present in the wireless network 20.

As indicated in FIG. 1, the network clusters 24, 26 are groups of nodes 22 that may easily communicate with network nodes within each network cluster 24, 26 because there are multiple communication routes through neighboring nodes 22. The number of network clusters is also not important as there may be more or less network clusters. The number of network clusters shown is for illustration purposes only.

FIG. 1 also illustrates that there is a single node L that is connected to a larger network 28, such as the Internet. Thus, any communication between the wireless network 20 and the larger network 28 must pass through node L. For example, node L may be the only node 22 which has a hard-wired connection to a switch or a router that is coupled to the larger network 28.

FIG. 1 also shows a communication bottleneck between the network clusters 24, 26 because there is a single connection between the first network cluster 24 and the second network cluster 26. The reason for the single connection between the clusters may occur when there are no other nodes 22 in the two network clusters 24, 26 that are close enough to communicate. The situation of a single communication path between network clusters 24, 26 may not be a problem as long as the nodes F and G do not fail, and the quality of the communication link remains high.

However, when the quality of the wireless connection between nodes F and G is poor, communication between the network clusters 24, 26 and between the network clusters and the larger network 28 may become intermittent or it may be constant but of low quality so that a data transfer rate is slow.

The result is that even if the nodes 22 of the first network cluster 24 can communicate well with each other, they may all have a poor connection to the Internet 28 if the communication link between nodes F and G is of poor quality.

The communication bottleneck identified in FIG. 1 may be discovered manually by mapping out the network nodes 22, identifying network clusters 24, 26, and then watching the flow of network traffic over a period of time. However, it would be an advantage over the prior art if the communication bottleneck could be identified by an automated system.

Another problem that may occur in wireless networks in the prior art is known as flapping. Flapping may be defined as the condition of a first node communicating with the rest of a network by selecting an alternating communication path of two different nodes A and B. In other words, the first node may constantly switch between nodes A and B when both of these nodes have a low quality of signal between the first node and both nodes A and B. A low signal quality may be referred to as a low Link Quality Indicator (LQI).

Node A may have a slightly better LQI than node B at a first moment in time, but have a lower LQI than node B at a second moment in time. It should be understood that a low LQI is any condition that results in a poor signal quality between two nodes, such as nodes F and G in FIG. 1.

Figure 2:
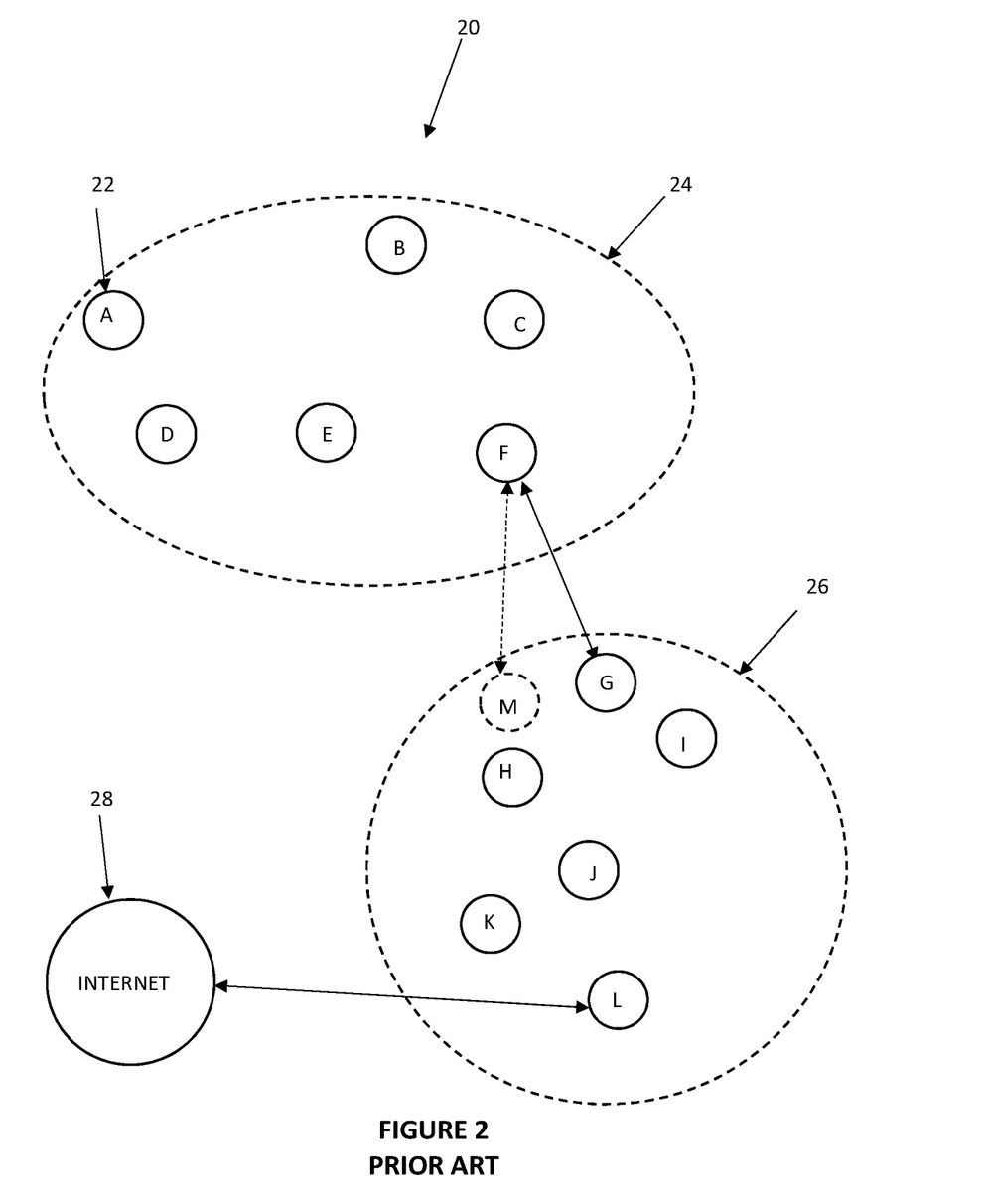
FIG. 2 is an illustration of a prior art wireless network illustrating a second topology that may suffer from a bottleneck in data flow between network clusters.

Flapping may be demonstrated in FIG. 2 where node F is shown being able to use a connection to node G and to node M. In this example, the LQI between nodes F and G and between nodes F and M is similar and poor. Thus, in an attempt to find a better path to the larger network 28, node F may switch back and forth between using nodes G and M when transmitting data. Flapping is a result of trying to find pathway of highest signal quality when that pathway is constantly changing.

It would be an advantage over the prior art if the automated system was able to identify a flapping condition and then prevent further flapping.

It should be understood that flapping does not occur when the LQI of both pathways is sufficiently high and there is no reason to change a pathway just because another pathway may be slightly higher. In other words, as long as the LQI is above a minimum threshold, no change in pathway is made.

Another type of problem that may occur in the prior art is a sporadic decrease in LQI. The decrease in LQI may or may not appear at a regular internal or be attributable to a specific amount of network traffic. The sporadic decrease in LQI may be the most difficult to assign to a specific cause.

It would be an advantage over the prior art to have a system that may be used for identifying communication weaknesses in a wireless network before that wireless network is being used. It would be another advantage if that system and method could be automated.

BRIEF SUMMARY

The present invention is a system and method for identifying weaknesses in a wireless network, wherein a wireless network control system exercises a wireless network by transmitting a large volume of data between nodes in order to identify network weaknesses and communication bottlenecks, wherein the wireless network control system is automated so that it may perform identification of network problems without user intervention, and wherein the wireless network control system may make suggestions as to how the weaknesses and communication bottlenecks may be repaired.

DETAILED DESCRIPTION

Reference will now be made to the drawings in which the various embodiments will be given numerical designations and in which the embodiments will be discussed so as to enable one skilled in the art to make and use the embodiments of the disclosure. It is to be understood that the following description illustrates embodiments of the present disclosure, and should not be viewed as narrowing the claims which follow.

The embodiments of the wireless network control system of the present invention are shown identifying network weaknesses and communication bottlenecks in a wireless network, and then how the wireless network control system may be automated. The wireless network control system may be used for any applications wherein a wireless network is used for communications and should not be considered as limited to operation of an access control system.

It was stated that the first embodiment of the wireless network control system may be used to improve any wireless communication network that is being used for any purpose, including but not limited to, access control, data transmission, video surveillance, or any other application where data is transmitted via a wireless network. Nevertheless, the embodiments of the present invention are being directed to a wireless network control system that is being used with a control access system in order to illustrate the invention.

Figure 3:
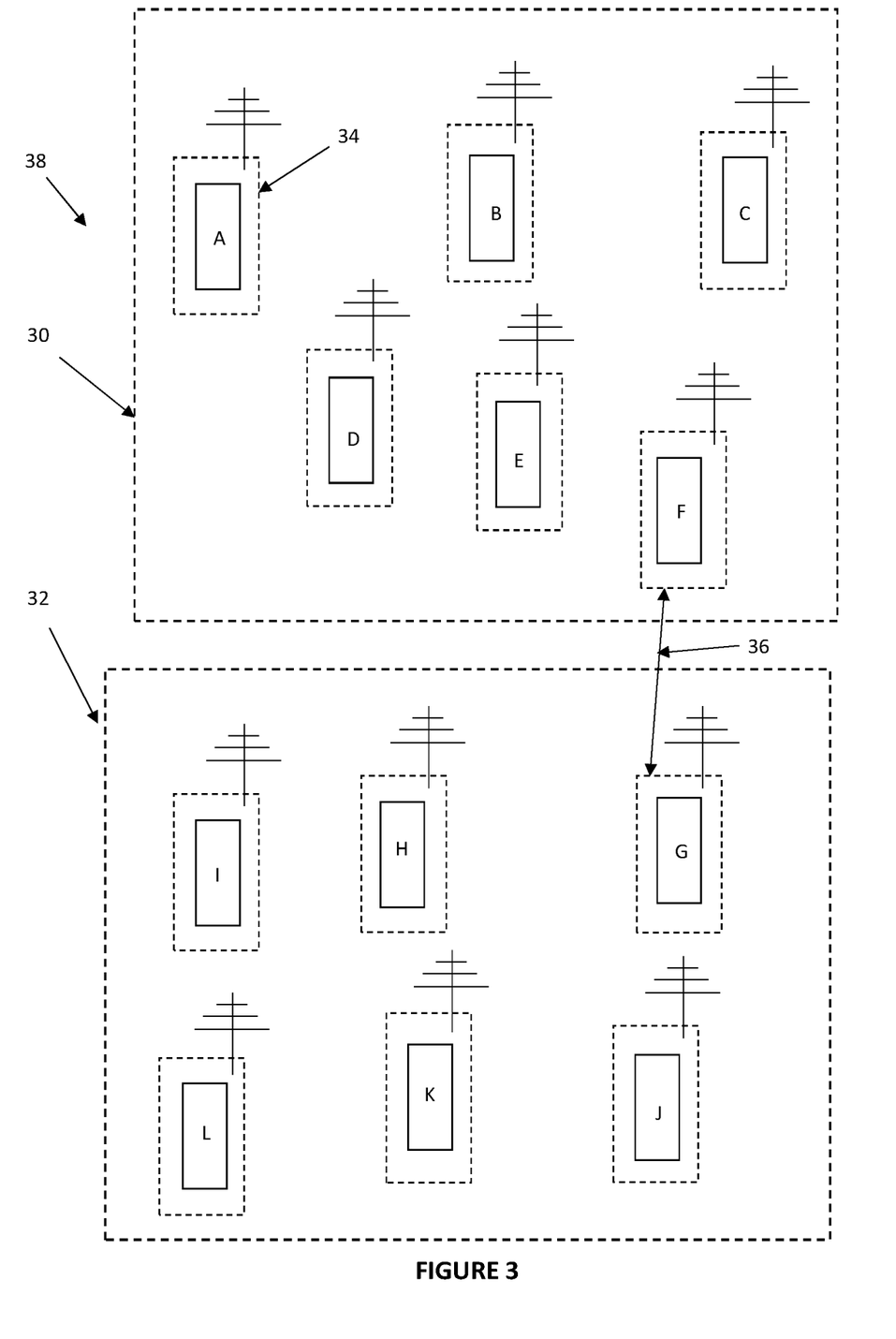
FIG. 3 is an illustration of a first embodiment of a door access control system.

A first embodiment of a wireless network control system that may be used for a door access control system is illustrated in FIG. 3. FIG. 3 shows a wireless network that is used to enable communication between network nodes (hereinafter "nodes") that are disposed at each door of an access control system, and to enable communication with another network 28.

For example, the door access control system shown in FIG. 3 may be a system that is cloud-based or it may be a closed system. A cloud-based access control system may be a system that uses data or processing power that is located outside the wireless network that is operating the door access control system in order to function. Reliable access to an outside network 28 may be important for consistent operation of the door access control system, or for providing means for repairing problems that are identified within the network. However, it should be understood that the invention enables improvements to a closed wireless network as well as to a wireless network that provides access to the outside network 28, such as the Internet.

In FIG. 3, the nodes 22 of FIGS. 1 and 2 are now shown as doors 34. The doors 34 may also be referred to in this document as nodes. Each node 34 may be an edge device as understood by those skilled in the art, the specific operation of which is not material to the present embodiments of the invention. What is important is that there are two network clusters 30 and 32 of nodes 34 that are labeled as A, B, C, D, E, F, G, H, I, J, K and L.

The specific physical topology of the wireless network is not important to the embodiments of the invention. FIG. 3 identifies a plurality of nodes 34 and network clusters 30, 32. Thus, the two network clusters 30, 32 may or may not be in two different buildings, may be on different floors of the same building, or may have some barrier that prevents transmission of data between the two network clusters 30, 32 except for between the pair of nodes F and G as indicated by arrow 36.

For the purposes of this example and description of the first embodiment of the invention, the two nodes F and G may be characterized as having a low LQI.

The wireless network that is being used by the door access control system of the first embodiment may require Internet access or access to some other network in order to be implemented using a cloud-based design or some other design where the door access control system is not running on a device that is located at one of the nodes 34.

Figure 4:
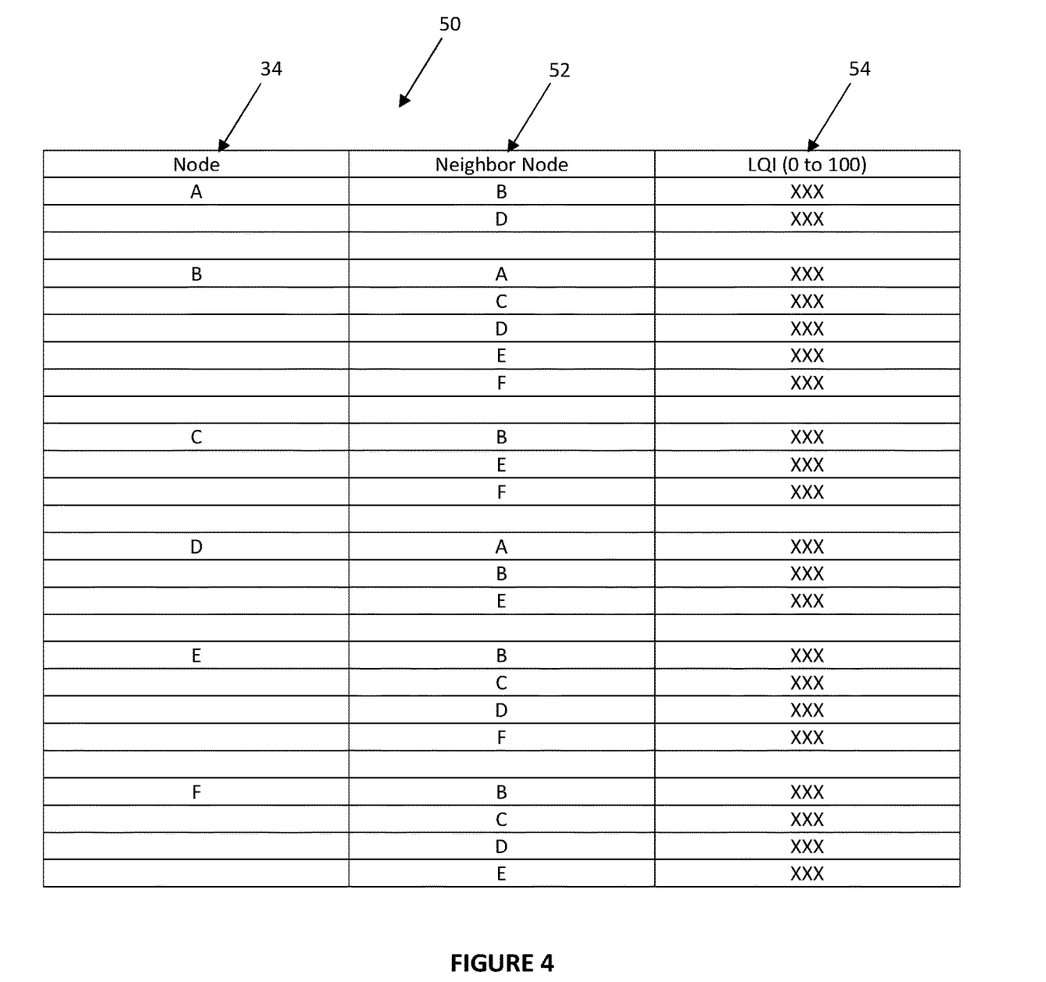
FIG. 4 is a table showing records that may be stored in a Neighbor Node database.

As shown in FIG. 4, in this first embodiment the wireless network control system may have a Neighbor Node database 50 for recording a node 34, a list of neighboring nodes 52 for the node, and an associated LQI 54 for each neighboring node that is within wireless communication range of the node. The Neighbor Node database 50 may be organized as shown in FIG. 4 which stores a record for each node 34. In this example, FIG. 4 keeps a record for each node (34) A, B, C, D, E, F, G, H, I, J, K and L.

FIG. 4 shows a record that is stored in memory such as a database for nodes A, B, C, D, E and F. Note that the Neighbor Node database 50 may not include all of the possible nodes 34 in the neighbor node list 52, but rather only those nodes that are within a wireless transmission range of the node. It should also be understood that the record for each node 34 may also include other information that may be useful for the wireless network control system to record.

Alternatively, a record for each node 34 may list all of the existing nodes in the wireless network regardless of whether the other nodes are within a wireless transmission range.

The Neighbor Node database 50 may be stored in the Cloud and controlled by the wireless network control system. The Cloud may be defined as a location on a network such as the Internet that is accessible by the nodes 34. Alternatively, the Neighbor Node database 50 may also be stored at each node 34 on the wireless network, or it may be stored in both locations. In another alternative, each node 34 only stores its own record showing each neighbor node 52 with which it can communicate, and the LQI 54 for each of those nodes.

The advantage of storing the Neighbor Node database 50 or just a single record at each node is that if the wireless network is cut off from the Cloud where the Neighbor Node database 50 may be stored, the wireless network control system may continue to function until the connection to the Cloud is restored.

In the first embodiment of the invention, the Neighbor Node database 50 may be generated before a wireless network is actively operated. This may be referred to as "exercising" the wireless network. In order to create the Neighbor Node database 50, a plurality of network packets or wireless network traffic is generated for the sole purpose of being able to evaluate network traffic. Thus, the wireless network control system may generate network traffic for a desired period of time that is sufficient to create the Neighbor Node database 50, and to generate an LQI for each pair of network nodes 34. For some network nodes 34, the LQI will be zero or a null value if the nodes 34 are not capable of communicating.

Alternatively, the wireless network control system may not generate any network traffic, but may just begin to create a record for each node 34 and to record the LQI for each node pair during normal operation of the wireless network and then evaluate the wireless network for a sufficient period of time. The definition of a sufficient period of time will vary for different networks, but will depend on the number of nodes and the volume of network traffic that occurs during normal use.

There are situations in which it may be desirable to perform the first embodiment of the invention and to exercise the network to create the Neighbor Node database 50. This exercising of the network may be done before use of the wireless network, or it may be done during non-business hours when the wireless network is not in use. Exercising of the network may also be useful in order to perform troubleshooting of a network that is having problems, such as data dropouts, slow transmission speeds of the network or just of certain network clusters, etc.

The Neighbor Node database 50 may be updated after each transmission of a data packet between nodes. For example, the LQI between a node 34 and a neighbor node 52 may generate an LQI 54. This LQI 54 may be stored in the Neighbor Node database 50. It is most likely though not required that the LQI 54 may be the LQI of the last transmission between the node 34 and the neighbor node 52. Thus, when a node 34 is determining a pathway to another node, it may select the neighbor node 52 that has the shortest path as long as the neighbor node has an LQI that is over a minimum LQI threshold, or it may decide to use a different neighbor node with a higher LQI if the last neighbor node used was below the minimum LQI threshold, even if the pathway is longer.

The Neighbor Node database 50 may be regarded as a history of communications between a node 34 with neighbor nodes 52, and the quality of that communication. This history in the Neighbor Node database 50 may also include a log of every pathway that is used, or it may be a shorter list that only identifies the most recent communications. What is important in the first embodiment is that the log may include a current list of neighbor nodes 52 and the last known LQI 54 with each neighbor node.

One advantage of the Neighbor Node database 50 over the prior art is that by creating a history of pathways used and a current LQI 54 with each neighbor node 52, the wireless network may avoid having to send dummy transmissions that are only being used to collect that same information. Dummy transmission may slow overall communication of a wireless network when many dummy transmissions are used.

The function of exercising a wireless network may also have other advantages. It may be possible that problems on a wireless network may only be identified by simulating a large volume of wireless network traffic. There are some problems that that may only be identified by creating and then watching a large volume of network traffic.

The wireless network control system of the first embodiment of the invention may exercise a network in order to generate a history for each node to use in planning a communication pathway to a particular node. Alternatively, the history is generated on-the-fly through normal wireless network usage.

Consider the wireless network 38 shown in FIG. 3. Exercising the network 38 or normal network usage may also be used to identify network clusters. Network clusters may be identified by creating a network tree. A network tree may be used to identify network pathways from one node 34 to any other node, and from any node to another network. A network tree may be constructed by any of the methods already known to those skilled in the art.

Information that may be obtained from the network tree may include, for example, identifying communication pathways and identifying network clusters. Network clusters may be defined as nodes that may only communicate with other nodes by traveling through a single pair of network nodes, such as shown in FIG. 3. FIG. 3 shows that all nodes in network cluster 30 may only communicate with the nodes in network cluster 32 when they must travel through the pair of nodes F and G.

If a network tree is created for FIG. 3, it may show that the first network cluster 30 may only communicate with a second network cluster 32 through nodes F and G as shown by the communication pathway 36.

After all communication pathways have been identified through the construction of one or more network trees, the wireless network control system may then identify any communication pathways that have a LQI below a certain threshold.

For example, assume that the LQI is a scale from 0 to 100. The LQI may use any scale, and this example is for illustration purposes only. After exercising the network or after operation of the network and creating a history, the Neighbor Node database 50 may now have sufficient information to identify weaknesses in the wireless network.

In the example above, the Neighbor Node database 50 may now contain information that the LQI between all the nodes 34 in network clusters 30, 32 are above 80, but that the LQI between nodes F and G may be identified as 20. The first embodiment of the wireless network control system may therefore identify all communication pathways that are below a predefined threshold, and therefore be identified as a communication bottleneck, weakness, or some other term for a potential or existing problem with the network 38. In this example, while the network clusters 30, 32 may communicate well with the nodes within the network cluster, communication between network clusters may be identified as poor.

The wireless network control system may be able to provide recommendations to an operator of the network about what steps may be taken to overcome the low LQI between network clusters 30, 32.

Figure 5:
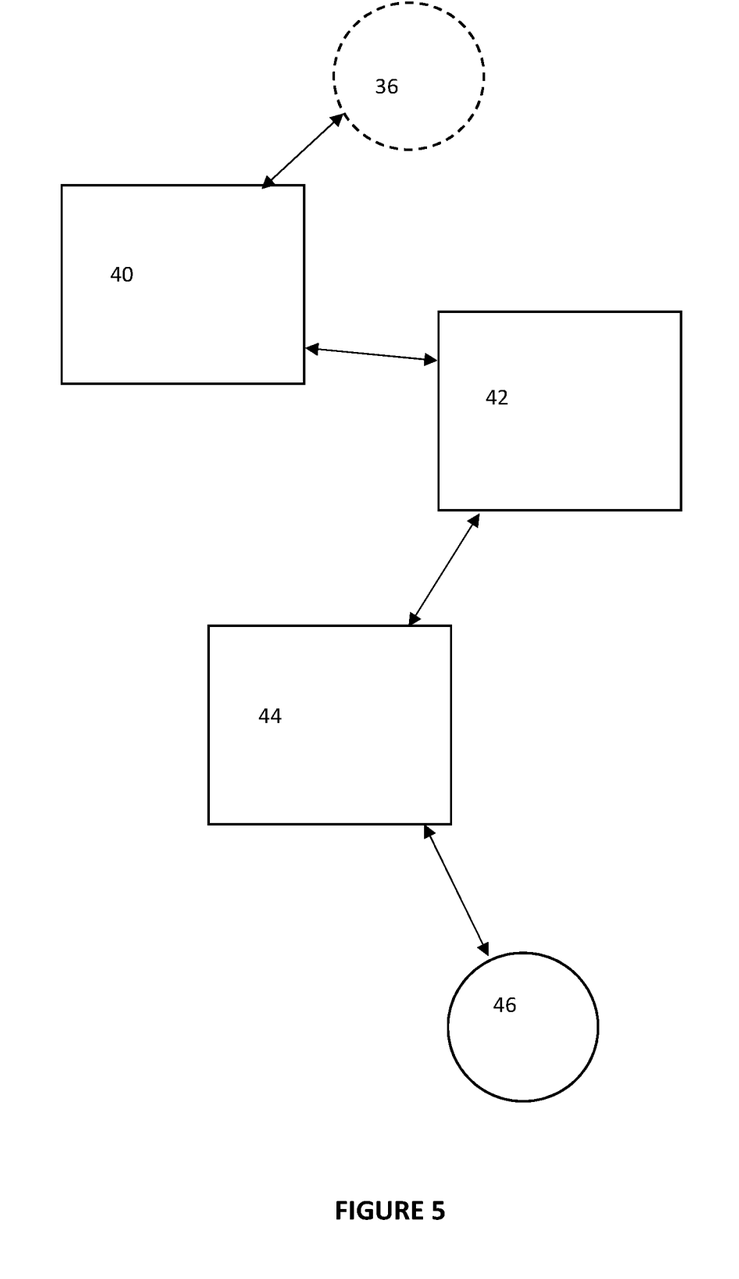
FIG. 5 is an illustration of a multi-network cluster system that may be improved by adding a hard-wired connection to the Internet.

The first embodiment may identify several options for improving communication pathways between the network clusters. Consider the network topology shown in FIG. 5. FIG. 5 shows that there may be three network clusters 40, 42, and 44 and the Internet 46.

In the first embodiment, a first option may be to identify if a network cluster is near to a location that has a hard-wired connection to a network. For example, network clusters 42 and 44 may both have good pathways to the Internet 46, but network cluster 40 does not because of the communication pathway between network cluster 40 and 42 has a low LQI. However, network cluster 40 may include a node which is near a network switch that is directly coupled to the Internet 46, or to another node of the network clusters 42 or 44. For example, a network switch 36 may be disposed within a data closet near to one of the nodes within network cluster 40. One possible solution is to recommend that the node in network cluster 40 be wired directly to the Internet 36 by connecting an Ethernet cable between the node and the switch 36, thus creating the network topology shown in FIG. 5.

Figure 6:
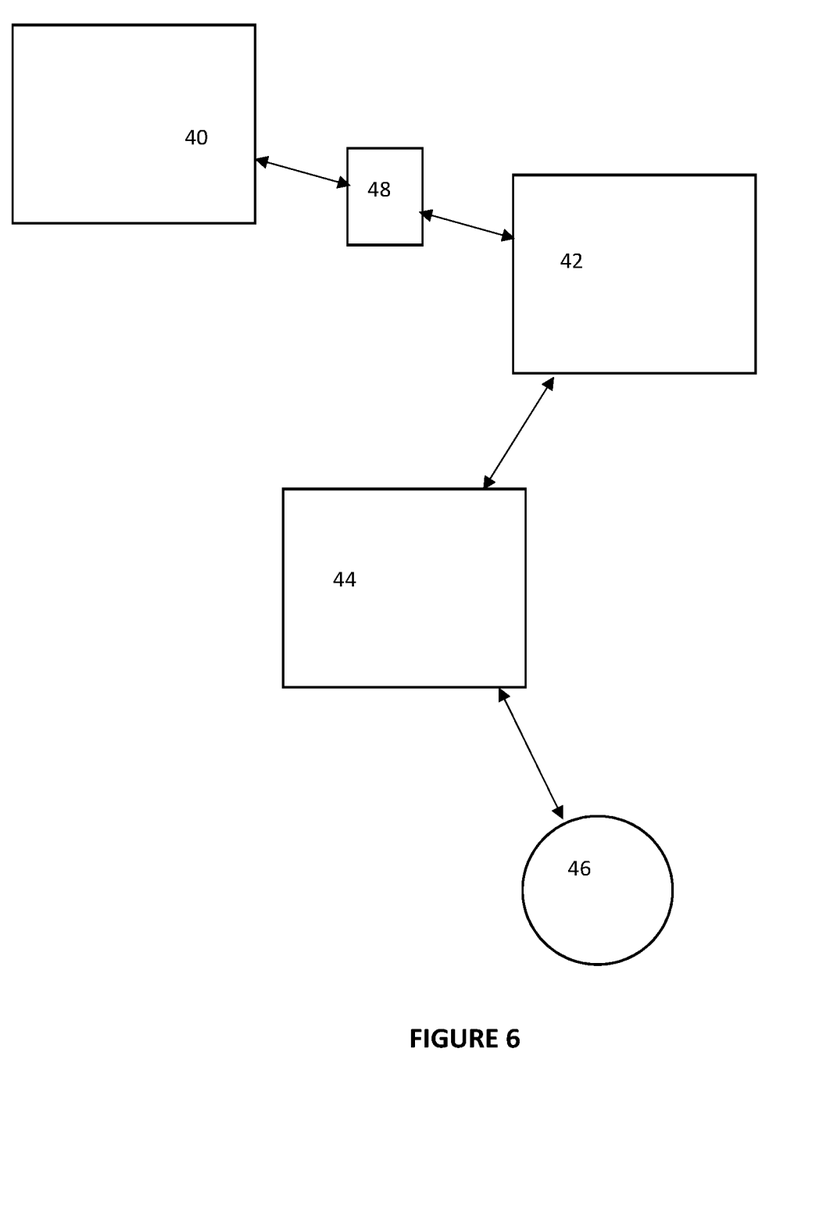
FIG. 6 is an illustration of a multi-network cluster system that may be improved by adding a repeater.

In the first embodiment, another option may be to identify a location between two network clusters where a repeater may be installed. Assume that the communication pathway with the low LQI is again between network clusters 40 and 42. As shown in FIG. 6, a repeater 48 may be installed between the network clusters 40, 42 to thereby increase the LQI of the communication pathway to be above a minimum threshold.

Another option may be directed to the use of Aggregators and Coordinators. A typical door access control system may have a single Coordinator that is disposed within a panel. The Coordinator may control timing in a door access control system and may function as a node. The Coordinator may function as an Aggregator if there is one node that manages all others in a command and control network, but it does not have to be a single node. The Coordinator may also function as a central processor for the door access control system.

The Aggregator may receive data from all of the nodes in a door access control system. Thus, when a door is opened, the node may not have any processing power, so the door open signal may be transmitted to the Aggregator. There may be multiple Aggregators in a single door access control system.

Figure 7:
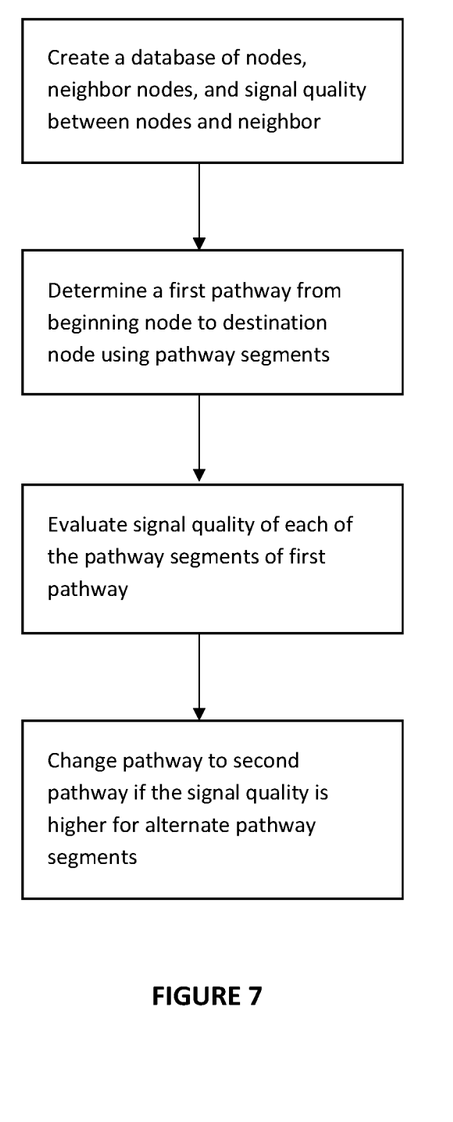
FIG. 7 is a flowchart of the first embodiment of the wireless network control system.

FIG. 7 is provided as a flowchart of the most basic steps of the first embodiment of the wireless network control system of the present invention. The first step may be to create a database of nodes, neighbor nodes, and signal quality between nodes and neighbor. The next step may be to determine a first pathway from beginning node to destination node using pathway segments. The third step may be to evaluate signal quality of each of the pathway segments of first pathway. The last step may be to change pathway to second pathway if the signal quality is higher for alternate pathway segments.

It should be understood that there are modifications that may be made to these steps, and there may be steps that may be performed before the first step, between these steps, and after these steps, but the first embodiment may begin with these.

The first embodiment of the wireless network control system may also perform a static analysis of the routing structure of a wireless network, it may perform a dynamic analysis, or it may perform both types of analysis.

A static analysis of the wireless network may be an instantaneous snapshot of the existing network tree and the LQI between each node in the network tree. In contrast, the dynamic analysis may be an analysis of network paths and LQI between nodes over a period of time. For example, while the static analysis may identify nodes with low LQI, it may not identify the condition of flapping. The dynamic analysis may identify a node that is intermittently or regularly changing a communication pathway between two different nodes of similarly low LQI. Accordingly, the first embodiment of the wireless network control system may perform both types of analysis, static and dynamic, in order to identify all the weaknesses and communication bottlenecks of the network.

By exercising the wireless network through data injection at the time of installation, both static and dynamic analysis may provide a more complete picture of the weaknesses of the wireless network, and thus both methods may be considered as options of the first embodiment.

A last problem that may be identified by the wireless network control system of the first embodiment is related to sporadic network connectivity issues. Sporadic network connectivity issues may be the most difficult to identify. For example, a wireless network may perform as required during static and dynamic analysis, and yet the wireless network may still sporadically fail.

The failure may be the result of interference that is outside the operation of the network itself. For example, consider a wireless network that operates over an area that includes several buildings. The wireless network may only fail during a certain time of day. The dynamic analysis may have to be performed in such a way that it is able to identify a time or a range of times over which communication between network clusters tends to fail. Thus, dynamic analysis of the wireless network may have to be performed for a complete 24 hours or more in order to identify an external cause of interference. Even this information may be useful to the analysis of the network as it lets the user look for potential sources of interference during the network outages, where the interference is not related to the network itself but to external sources.

Accordingly, the first embodiment of the invention may include the steps of exercising a network to create a large volume of network traffic that may be analyzed to identify network clusters, identify network clusters that may only communicate through a single node, identify flapping between nodes, watch for chains of single connected nodes that only talk to one other node, perform a static analysis, perform a dynamic analysis, identify network clusters that may be hard-wired to the Internet through a network switch, and identify locations where a repeater may increase network reliability.

The wireless network control system of the first embodiment may control the operation of the wireless network, may exercise the network, may perform a static analysis of the network, may perform a dynamic analysis of the network, may offer recommendations regarding attachment of nodes to a network switch in order to improve network cluster performance, and may offer recommendations regarding placement of a repeater in order to improve network cluster performance. wireless network control system may be implemented in the Cloud, may be implemented on a remote server, may be implemented on a local server, and may be distributed between nodes and in the Cloud.

Accordingly, the wireless network control system may operate regardless of local or remote placement, in a distributed system where data is stored in a distributed manner, and in a combined distributed and single location system where data is stored in a distributed manner and in a single location either remotely or locally. What may be critical is that the wireless network control system may continue to operate even if the wireless network is cut off from a network such as the Internet because of redundancy that is built-in to the system. This redundancy applies to the distribution of the database that stores a history of the network of the nodes such as in the Neighbor Node database 50, and to the program which is executing the commands of the wireless network control system. Thus, the wireless network control system may be located locally in a local server or remotely on a server in the Cloud.

A method of using the first embodiment of the invention may include the following steps. The first step of the method may be to create a database comprised of a history of network paths used, and the quality of signals between nodes. More specifically, the database may be a Neighbor Node database 50 for storing a list of the plurality of nodes, a list of neighbor nodes for each of the plurality of nodes, and the quality of a signal between each of the plurality of nodes and each neighbor node when data is transmitted from each node to each neighbor node.

More specifically, the database may include a plurality of records, one record for each of the plurality of nodes in the wireless network. Each record stored in the Neighbor Node database 50 may include the node that is being evaluated, which may be called the transmit node, and a list of neighbor nodes of the transmit node with which the transmit node is able to communicate using the wireless network. Each record may also include the link quality indicator that indicates a quality of a link between the transmit node and each of the neighbor nodes.

The next step of the method may be to transmit data from one node on the wireless network to another node. There may be a beginning node and a destination node in the pathway. The pathway may be comprised of a series of pathway segments that a network packet must travel to move from the beginning node to the destination node.

For example, suppose that the beginning node is node A in FIG. 3, and that the destination node is node K. One possible pathway that the network packet may follow may be defined by the following pathway segments: node A to D, node D to E, node E to F, node F to G, node G to J, and node J to K. This may be selected as the first pathway. How the first pathway is selected from the beginning node to the destination node is known to those skilled in the art and is not a part of the first embodiment.

Once the first pathway has been selected, the wireless network control system may alter that pathway by changing one or more pathway segments. The wireless network control system may determine that pathway segments should be changed if one or more of the pathway segments include an LQI that is below a minimum LQI threshold value. For example, the wireless network control system may have a preselected and user changeable minimum LQI threshold of 40 (out of 100). In this first example, it may be assumed that the first pathway segment node G to J has an LQI of 35. The wireless network control system may look to an alternate second pathway through the nodes. The Neighbor Node database 50 may show that transmit node G has an LQI of 50 to node H and an LQI of 30 to node K. Therefore, the wireless network control system may change the pathway segment of node G to J to node G to H, and then node H to K to create the second pathway.

It should be understood that this change in the pathway is only an example. It may be the case that the wireless network control system may determine that is not in the best interest to change the pathway if another alternate pathway has an LQI that is even lower than the pathway that is already selected.

It should be understood that the method of determining the LQI of each pathway segment is known to those skilled in the art and is also not considered a limiting part of the invention. The wireless network control system may use any technique known to those skilled in the art of determining a quality of signal between nodes.

It may be the case that any pathway that the network packet must travel may include at least one pathway segment that has an LQI that is below the minimum LQI threshold. Therefore, the wireless network control system may choose the pathway that has the highest LQI even if one or more pathway segments are below the minimum LQI threshold. What is important is that the wireless network control system is able to evaluate the pathways and make changes that are determined to be an improvement in the pathway over the pathway that was initially selected.

However, when selecting the pathway with the best LQI at a particular moment in time, it may also be necessary to prevent flapping, where the pathway is constantly being changed because two or more pathways all include at least one pathway segment having an LQI below the predetermined minimum LQI threshold. Accordingly, the first embodiment of the wireless network control system may include the ability to prevent flapping.

The first embodiment of the wireless network control system may prevent flapping by various methods. A first flapping prevention method may include reusing the same pathway if all alternative pathways include at least one pathway segment that is below the predetermined minimum LQI threshold. However, the first flapping prevention method may also continue to re-evaluate all of the pathways each time that a network packet is transmitted, and changing the pathway if one of the pathways being evaluated has all pathway segments above the predetermined minimum LQI threshold.

The first embodiment of the wireless network control system may also be used to identify network clusters.

Identifying Network Clusters is Performed by

Although the preceding description has been described herein with reference to particular means, materials, and embodiments, it is not intended to be limited to the particulars disclosed herein; rather, it extends to all functionally equivalent structures, methods, and uses, such as are within the scope of the disclosure. Accordingly, all such modifications are intended to be included within the scope of this disclosure. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for improving network traffic on a wireless network using current signal quality conditions, said method comprising:
   providing a wireless network having a plurality of nodes, providing a wireless network control program running on a processor, and wherein the wireless network control program may observe and control any path of a network packet on the wireless network;
   creating a neighbor node database having a list of the plurality of nodes, a list of neighbor nodes for each of the plurality of nodes, and a current signal quality between each of the plurality of nodes and each neighbor node;

enabling the plurality of nodes to determine a first pathway from a beginning node to a destination node using a plurality of pathway segments when a network packet is to be transmitted;

evaluating the first pathway before the network packet is transmitted by looking at the signal quality of the plurality of pathway segments of the first pathway by examining the current signal quality being stored in the neighbor node database;

identifying a problem in the first pathway because the signal quality of at least one segment in the plurality of pathway segments is below a predetermined signal quality threshold;

identifying the at least one segment that is below a predetermined signal quality threshold by evaluating the signal quality of each of the plurality of pathway segments in the first pathway; and changing the first pathway to a second pathway by changing at least one pathway segment if the second pathway is determined to be an improvement in signal quality over the first pathway by using the current signal quality stored in the neighbor node database.

2. The method as defined in claim 1 wherein the step of creating a neighbor node database further comprises creating the neighbor node database for the wireless network control program for storing the node pathway history, said neighbor node database including a plurality of records, one record for each of the plurality of nodes, each record including a transmit node, a list of neighbor nodes of the transmit node with which the transmit node is able to communicate using the wireless network, and a link quality indicator (LQI) that indicates the current signal quality of a link between the transmit node and each of the neighbor nodes.

3. The method as defined in claim 2 wherein the method further comprises ranking the signal quality of each link between nodes on a scale of 0 to 100.

4. The method as defined in claim 2 wherein the method further comprises evaluating the plurality of pathway segments of the first pathway if any of the plurality of pathway segments has an LQI that is below a minimum LQI threshold.

5. The method as defined in claim 1 wherein the method further comprises exercising the wireless network to thereby create a large volume of network traffic to thereby provide information for the wireless network control program to be able to analyze the pathways selected for network packets.

6. The method as defined in claim 1 wherein the method further comprises evaluating the wireless network over a period of time that is sufficient to watch a large volume of network traffic to thereby provide information for the wireless network control program to be able to analyze the pathways selected for network packets.

7. The method as defined in claim 6 wherein the method further comprises using the wireless network control program to identify network clusters, identify network clusters that may only communicate through a single node, identify and prevent flapping between nodes, identify chains of single connected nodes that only communicate with one other node, perform a static analysis, perform a dynamic analysis, identify network clusters that may be hard-wired to the Internet through a network switch, and identify locations where a repeater may increase network reliability.

8. The method as defined in claim 7 wherein the method further comprises using the wireless network control program to perform a static analysis of the wireless network to thereby obtain a current status of the neighbor node database including the list of the plurality of nodes, the list of neighbor nodes for each of the plurality of nodes, and the link quality indicator between each of the plurality of nodes and each neighbor node.

9. The method as defined in claim 7 wherein the method further comprises using the wireless network control program to perform a dynamic analysis of the wireless network to thereby obtain a status of the neighbor node database over a predetermined period of time including the list of the plurality of nodes, the list of neighbor nodes for each of the plurality of nodes, and the link quality indicator between each of the plurality of nodes and each neighbor node over the predetermined period of time.

10. The method as defined in claim 7 wherein the method of preventing flapping of the wireless network further comprises:

reusing the same pathway if all alternative pathways include at least one pathway segment that is below the predetermined minimum LQI threshold; and re-evaluating all of the pathways each time that a network packet is transmitted, and changing the pathway if one of the pathways being evaluated has all pathway segments above the predetermined minimum LQI threshold.

11. The method as defined in claim 7 wherein the method of identifying clusters further comprises creating at least one network tree, wherein the network tree may identify a pair of nodes through which all network packets must travel when network packets are sent from a first cluster to a second cluster, wherein the first cluster will contain a first node of the pair of nodes, and the second cluster will contain a second node of the pair of nodes.

12. The method as defined in claim 11 wherein the method of improving network performance further comprises:

identifying all nodes of each cluster that is identified by the wireless network control program; and identifying all nodes of each cluster that are adjacent to a network switch such that the network switch may be coupled to a node in a cluster.

13. The method as defined in claim 11 wherein the method of improving network performance further comprises:

identifying all nodes of each cluster that is identified by the wireless network control program; and disposing a repeater between the pair of nodes that link a pair of network clusters.

* * * * *